F. FAIRBANKS.
Device for Weighing Samples of Grain.

No. 198,364.                Patented Dec. 18, 1877.

Witnesses:
A. Henry Gentner
H. A. Johnstone.

Inventor:
Franklin Fairbanks
by his attorney
J. D. Stetson
New York

UNITED STATES PATENT OFFICE.

FRANKLIN FAIRBANKS, OF ST. JOHNSBURY, VERMONT.

IMPROVEMENT IN DEVICES FOR WEIGHING SAMPLES OF GRAIN.

Specification forming part of Letters Patent No. 198,364, dated December 18, 1877; application filed September 28, 1877.

*To all whom it may concern:*

Be it known that I, FRANKLIN FAIRBANKS, of St. Johnsbury, Caledonia county, in the State of Vermont, have invented certain new and useful Improvements in Cornometers, by which I mean the well-known apparatus used in the grain business to determine the weight per bushel of a lot of grain by weighing a small sample.

The following specification is a full and exact description thereof as improved by me:

My improvement enables the device to perform all its ordinary functions, and, in addition, to determine the actual weight of any small quantity within the capacity of the receiver, and, by simple operations, to show graphically the percentage of waste which is removed by winnowing.

My improved instrument may be in all respects in the ordinary form and proportions, except that there are peculiar and additional lines of graduations on the beam thereof.

The following is a description of what I consider the best means of carrying out the invention.

The accompanying drawings form a part of this specification.

Figure 1:
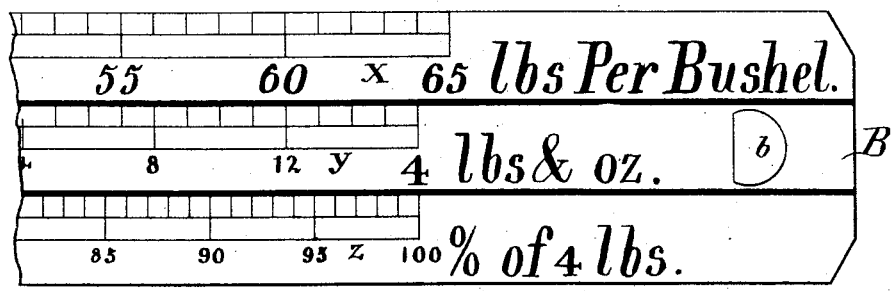
Figure 2:
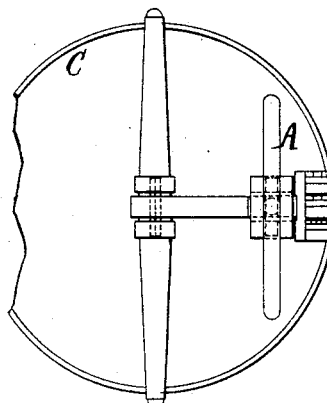

Figure 1 is a plan view, showing a part of the beam with a part of each of the three lines of graduations. Fig. 2 is a plan view, representing the entire cornometer on a smaller scale.

Similar letters of reference indicate like parts in both figures.

A is the ordinary suspending-ring, by which the instrument is held up by the hand or attached to any convenient cord, wire, or other suspending means. B is a beam of brass or other suitable material, which, it will be understood, is connected by knife-edges to the suspending-handle A, and carries knife-edges, which form the ordinary frictionless connection to the receiver C. D is a sliding weight, adapted to be moved outward and inward on the beam B, and to be arrested at the extreme outer point by a stop, $b$.

There are three independent series of graduations lying together on the upper surface of the beam B. The first is the ordinary series, and is marked $x$. It is so proportioned to the carefully-determined capacity of the receiver C that the position in which the weight D balances the level-filled receiver indicates exactly the weight per bushel of the grain.

It is common to make the capacity of the receiver C exactly two quarts; but this may be varied, care being taken to make the proportions of the instrument correspond.

The next series of graduations, $y$, is entirely independent of the series $x$, and indicates the weight of the small quantity (two quarts) of grain in the receiver C.

The third series of graduations, $z$, is peculiar. It is formed by extending the mark opposite to the four pounds in the series $y$ across the path of this series, and subdividing the whole space between the mark thus formed and zero in one hundred equal parts, plainly indicated. This makes a scale for percentages.

To use my improved instrument in the ordinary way, the receiver C is filled with grain and the top struck off level. On suspending this and moving the weight D to balance, the weight per bushel of the cargo of grain of which this is a sample is determined on the series of graduations $x$, in the ordinary manner.

My improved apparatus allows of further uses, as follows: First, if it be desired to weigh any predetermined quantity of grain less than the full capacity of the receiver C, it is effected by putting the poise or weight D on the figure required on the series of graduations $y$, and carefully introducing the grain in the receiver C until it balances. This property of the instrument is availed of to put in the receiver exactly four pounds of grain. This done, the next step is to winnow or otherwise clean such grain, or, in some cases perhaps, to remove by hand or by machinery certain adhering matter. Either the residue of the grain after such cleaning or the waste removed by the cleaning process—either but not both—being put back in the pan C, the poise D is now moved to the new position required to balance this smaller quantity, and, on obtaining the right position, the series of graduations $z$ gives instantly, by inspection, the percentage which such quantity of clean grain or such quantity of dirt, as the case may be, bears to the whole.

My experiments indicate that the improved instrument is likely to be of great value in the grain business. It diminishes the labor and decreases the risk of mistake in rapidly sampling and calculating on many cargoes in the excitement of active business.

My invention avoids the necessity for mental labor in determining percentages when exactly four pounds are weighed. In the use of light grain I can employ half the quantity—two pounds—and simply double the percentage, which the position of the weight will then indicate. This operation is so simple as not to materially add to the mental labor.

I claim as my invention—

The combination of the suspensory means A, receiver C, and poise D with the beam B, having the three series of graduations $x\ y\ z$, adapted to serve together, and determine, not only the weight per bushel, but also the actual weight and the percentage of waste, as and for the purposes herein specified.

In testimony whereof I have hereunto set my hand this 21st day of September, 1877, in the presence of two subscribing witnesses.

FRANKLIN FAIRBANKS.

Witnesses:
E. D. BLODGETT,
E. A. WALKER.